United States Patent
Wang et al.

(10) Patent No.: US 10,481,451 B2
(45) Date of Patent: Nov. 19, 2019

(54) PIXEL STRUCTURE, DISPLAY PANEL, AND CURVED DISPLAY DEVICE

(71) Applicant: Au Optronics Corporation, Hsinchu (TW)

(72) Inventors: Jia-Hong Wang, Kaohsiung (TW); Ya-Ling Hsu, New Taipei (TW)

(73) Assignee: Au Optronics Corporation, Hsinchu (TW)

( * ) Notice: Subject to any disclaimer, the term of this patent is extended or adjusted under 35 U.S.C. 154(b) by 118 days.

(21) Appl. No.: 15/490,913

(22) Filed: Apr. 19, 2017

(65) Prior Publication Data

US 2017/0315414 A1 Nov. 2, 2017

(30) Foreign Application Priority Data

Apr. 27, 2016 (TW) .............................. 105113054 A

(51) Int. Cl.
*G02F 1/1362* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G02F 1/136209* (2013.01); *G02F 2201/123* (2013.01); *G09G 3/3648* (2013.01); *G09G 2300/0439* (2013.01); *G09G 2320/0233* (2013.01)

(58) Field of Classification Search
CPC ............. G02F 1/126286; G02F 1/1368; G02F 1/136209
See application file for complete search history.

(56) References Cited

U.S. PATENT DOCUMENTS

| | | | |
|---|---|---|---|
| 6,215,541 B1* | 4/2001 | Song ................. | G02F 1/136204 349/141 |
| 9,140,948 B2 | 9/2015 | Chang et al. | |
| 9,470,945 B2 | 10/2016 | Chang et al. | |
| 2012/0105777 A1 | 5/2012 | Lee et al. | |
| 2013/0176515 A1 | 7/2013 | Chang et al. | |
| 2015/0129877 A1* | 5/2015 | Cho .................. | G02F 1/134363 257/59 |
| 2015/0227012 A9 | 8/2015 | Chang et al. | |
| 2015/0362813 A1 | 12/2015 | Chang et al. | |
| 2016/0202543 A1* | 7/2016 | Park .................... | G02F 1/13394 349/42 |

FOREIGN PATENT DOCUMENTS

| | | |
|---|---|---|
| CN | 1832177 | 9/2006 |
| CN | 101126874 | 2/2008 |

(Continued)

*Primary Examiner* — Dung T Nguyen
(74) *Attorney, Agent, or Firm* — JCIPRNET

(57) ABSTRACT

A pixel structure is provided. The pixel structure has a first substrate, a scan line, a data line, an active device, a pixel electrode, and a conductive strip-shaped pattern. The scan line and the data line are located on the first substrate. The active device is electrically connected to the scan lines and the data line. The pixel electrode is electrically connected to the active device. The conductive strip-shaped pattern is correspondingly disposed over the data line. The conductive strip-shaped pattern has an opening at least partially overlapped with the data line in a vertical projection at the first substrate.

13 Claims, 11 Drawing Sheets

(56) References Cited

FOREIGN PATENT DOCUMENTS

| CN | 102122655 | 7/2011 |
|----|-----------|--------|
| CN | 102436996 | 7/2014 |
| TW | 201118489 | 6/2011 |
| TW | I386743 | 2/2013 |
| TW | I412857 | 10/2013 |

* cited by examiner

PIXEL STRUCTURE, DISPLAY PANEL, AND CURVED DISPLAY DEVICE

CROSS-REFERENCE TO RELATED APPLICATION

This application claims the priority benefit of Taiwan application serial no. 105113054, filed on Apr. 27, 2016. The entirety of the above-mentioned patent application is hereby incorporated by reference herein and made a part of this specification.

BACKGROUND OF THE DISCLOSURE

Field of Disclosure

The present disclosure relates to a pixel structure, especially to a display panel using the same and a curved display device.

Description of Related Art

With the advancement of science and technology, the technology of displays is also continuously developed. Accordingly, light and compact flat-panel displays (FPD) have gradually replaced conventional cathode Ray Tube (CRT) displays. Nowadays, due to the flat-panel displays have the advantages of light weight, compact volume, and slim size, the flat-panel displays are further adopted to be disposed on non-flat surfaces of buildings or electronic equipment. In order to fit the non-flat surfaces, the displays are needed to have a curvature, therefore curved displays are further announced. Particularly, a display capable of being simultaneously used on flat and curved surfaces has gradually received more attention.

However, after a liquid crystal display (LCD) panel is bent and/or aligned, an upper substrate and a lower substrate of the LCD panel receive different stress and thus are displacement from each other, which may cause a black matrix of the LCD panel to shift. Accordingly, the black matrix of the LCD panel being shifted covers an aperture area as originally designed. In other words, the black matrix covers scan lines, data lines and at least a portion of pixel electrodes, thereby decreasing an aperture ratio. As such, light leakage is generated due to incorrect inclination of liquid crystal molecule and undesired electric field. Besides, after the LCD panel is bent, since different stresses are generated at different locations of the LCD panel, the levels of displacement of the upper and lower substrate are also not the same, which additionally causes the issues of low contrast and uneven brightness (Mura).

SUMMARY OF THE DISCLOSURE

The disclosure provides a pixel structure, a display panel and a curved display device which not only avoid the issues of uneven brightness, uneven contrast and light leakage caused by a displacement between upper and lower substrates, but also reduce resistance-capacitance loading (RC loading), thereby enhancing display quality.

The disclosure provides a pixel structure, and the pixel structure includes a first substrate, a scan line, a data line, an active device, a pixel electrode, and a conductive strip-shaped pattern. The scan line and the data line are located on the first substrate. The active device is electrically connected to the scan line and the data line. The pixel electrode is electrically connected to the active device. The conductive strip-shaped pattern is correspondingly disposed over the data line, in which the conductive strip-shaped pattern has an opening that is at least partially overlapped with the data line in a vertical projection on the first substrate.

The disclosure also provides a display panel, and the display panel includes a first substrate, a pixel array, a second substrate, an electrode film, and a liquid crystal layer. The pixel array is disposed on the first substrate and includes a plurality of pixel structures. At least a portion of the pixel structures includes a first substrate, a scan line, a data line, an active device, a pixel electrode, and a conductive strip-shaped pattern. The active device is electrically connected to the scan line and the data line. The pixel electrode is electrically connected to the active device. The conductive strip-shaped pattern is correspondingly disposed over the data line, in which the conductive strip-shaped pattern has an opening that is at least partially overlapped with the data line in a vertical projection on the first substrate. The second substrate is disposed opposite to the first substrate. The electrode film is disposed on the second substrate, in which a voltage applied to the electrode film is substantially the same as a voltage applied to the conductive strip-shaped pattern of each pixel structure. The liquid crystal layer is located between the first substrate and the second substrate.

In the disclosure, a curved display device includes the aforementioned display panel, a backlight module, and a bending element. The backlight module is located at a side of the display panel. The backlight module and the display panel are fixed through the bending element so that the display panel and the backlight module have a curvature.

Based on the above, in the pixel structure and the display panel of the disclosure, the conductive strip-shaped pattern is correspondingly disposed over the data line, and the conductive strip-shaped pattern has the opening that is at least partially overlapped with the data line in a vertical projection on the first substrate. The issues of uneven brightness, uneven contrast and light leakage caused by a displacement between the upper and lower substrates of the display panel can be prevented, an overlapping area between the conductive strip-shaped pattern and the data line can be decreased, and the RC loading can be reduced, thereby ensuring display quality and the transmittance.

Several exemplary embodiments accompanied with figures are describe in detail below to further describe the disclosure in details.

DETAILED DESCRIPTION OF DISCLOSED EMBODIMENTS

Figure 1:
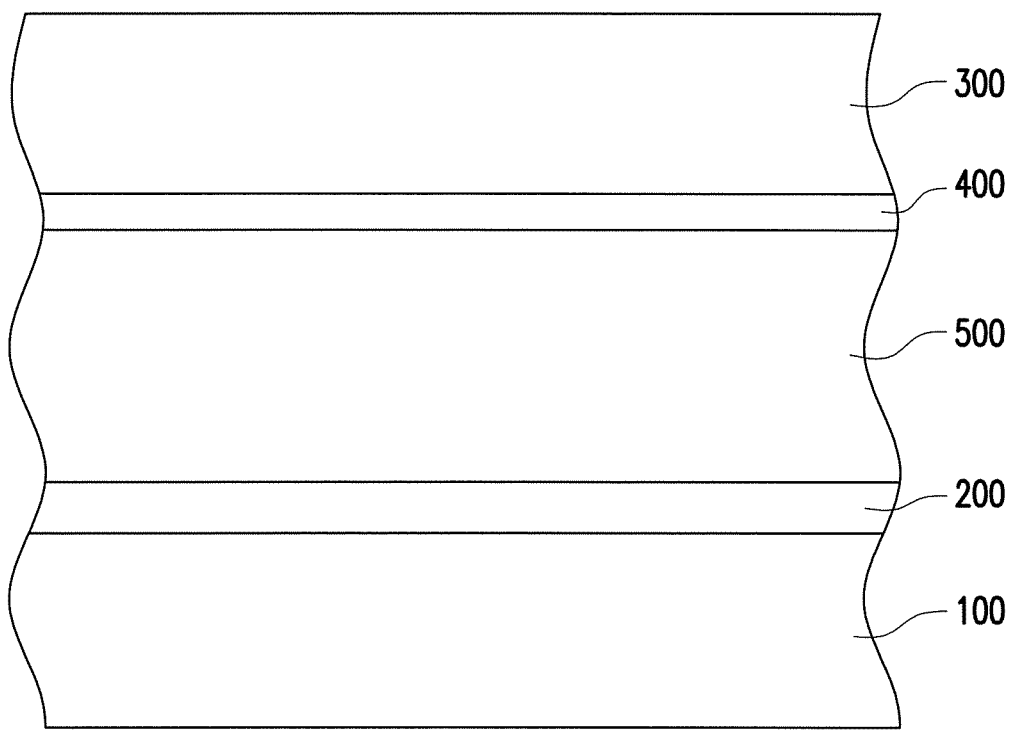
FIG. 1 is a schematic cross-sectional view illustrating a display panel according to an embodiment of the disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" or "connected to" another element, it can be directly on or connected to the other element or intervening elements may also be present. In contrast, when an element is referred to as being "directly on" or "directly connected to" another element, there are no intervening elements present. As used herein, "connected" may refer to a physical and/or electrical connection.

"About" or "substantially/approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, ±15%, ±10%, ±5%, ±3% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

FIG. 1 is a schematic cross-sectional view illustrating a display panel according to an embodiment of the disclosure. Referring to FIG. 1, the display panel 10 includes a first substrate 100, a pixel array 200, a second substrate 300, an electrode film 400, and a liquid crystal layer 500.

The first substrate 100 may be glass, quartz, an organic polymer, or a non-light-transmissive/reflective material (such as a conductive material, metal, wafer, ceramics, or other suitable materials), or other suitable materials, but is not limited thereto. If a conductive material or a metal is used, then the first substrate 100 is covered with an insulating layer (not shown) to prevent short circuiting. The pixel array 200 is disposed on the first substrate 100, the pixel array 200 includes a plurality of pixel structures (not shown), and the detailed structure of the pixel array 200 will be elaborated in following descriptions.

The second substrate 300 is disposed opposite to the first substrate 100. A material of the second substrate 300 may be made of glass, quartz, an organic polymer, or any other appropriate material. In detail, when the material of the first substrate 100 is not metal, the material of the second substrate 200 may be the same as or different from the material of the first substrate 100. Furthermore, in the embodiment, one of ordinary skill in the art can choose to dispose a color filter layer (not shown) and a black matrix (not shown) on the first substrate 100 or the second substrate 300 according to the need or design.

The electrode film 400 is disposed on the second substrate 300 and between the first substrate 100 and the second substrate 300. The electrode film 400 can be a transparent conductive layer, and a material thereof includes metal oxides such as indium tin oxide (ITO), indium zinc oxide (IZO), or other suitable materials. The electrode film 400 completely covers the second substrate 300. In other words, the electrode film 400 completely covers the pixel structures P of the pixel array 200. Or, the electrode film 400 is patterned to be correspondingly disposed on the second substrate 300, in which each of the electrode film 400 being patterned is overlapped with the corresponding pixel structure P located on the first substrate 100. In the embodiment, the electrode film 400 is preferred to completely cover the second substrate 300 as an exemplary example, but is not limited thereto. The electrode film 400 is electrically connected to a common voltage (Vcom), and when a pixel voltage (Vp) different from the common voltage Vcom is applied on the pixel array 200, a vertical electric field is generated between the pixel array 200 and the electrode film 400 so as to drive the liquid crystal layer 500 located between the pixel array 200 and the electrode film 400.

The liquid crystal layer 500 is located between the first substrate 100 and the second substrate 300. The liquid crystal layer 500 may include liquid crystal molecules, or other suitable materials (such as an electrophoretic display medium, or others). In the following embodiments, the liquid crystal layer 500 includes liquid crystal molecules as an exemplary example, but the disclosure is not limited thereto.

Figure 2A:
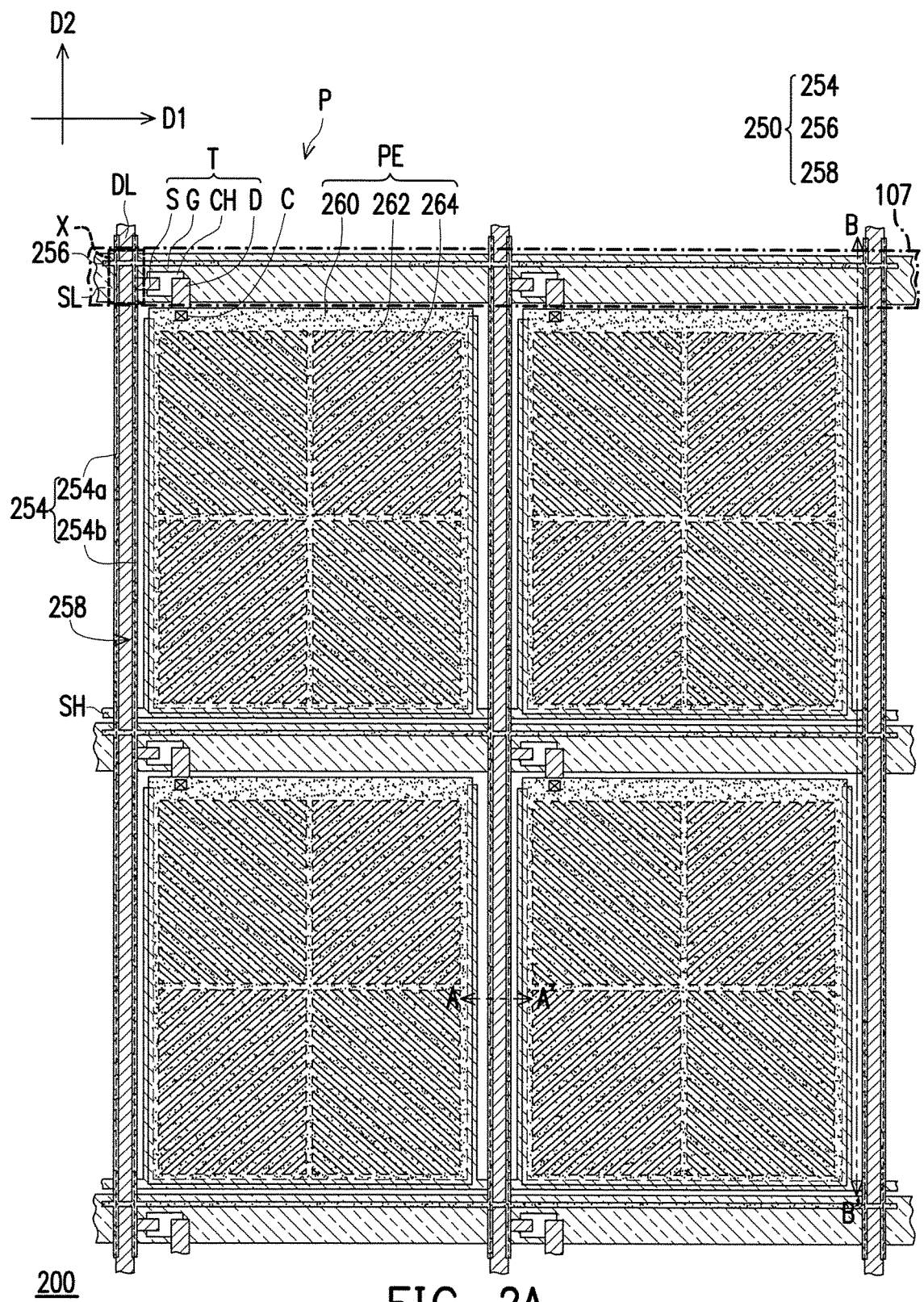
FIG. 2A is a schematic top view illustrating a pixel array according the embodiment of FIG. 1.
Figure 2B:
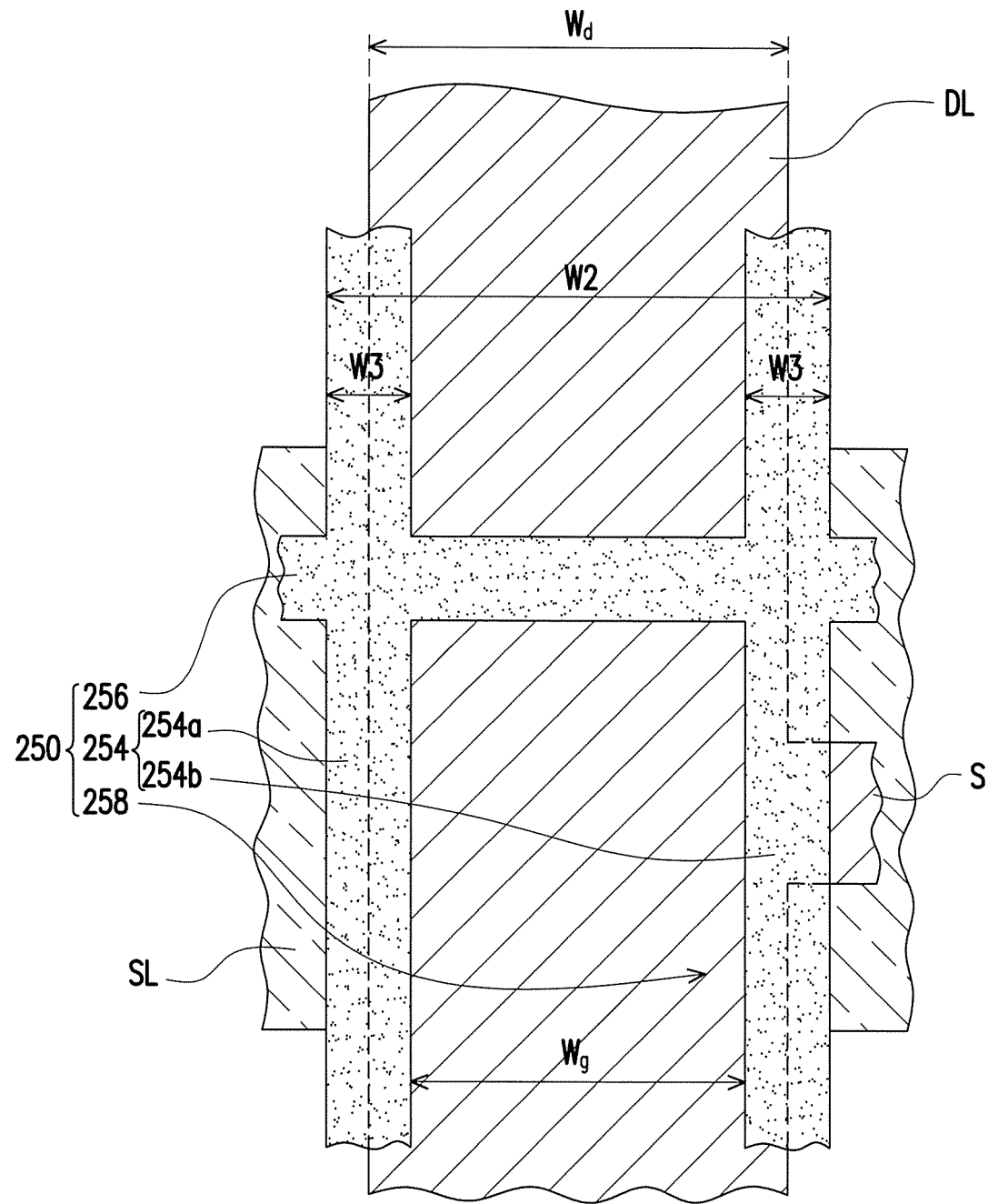
FIG. 2B is a schematic top view illustrating the partial region of the pixel array depicted in FIG. 2A.
Figure 3:
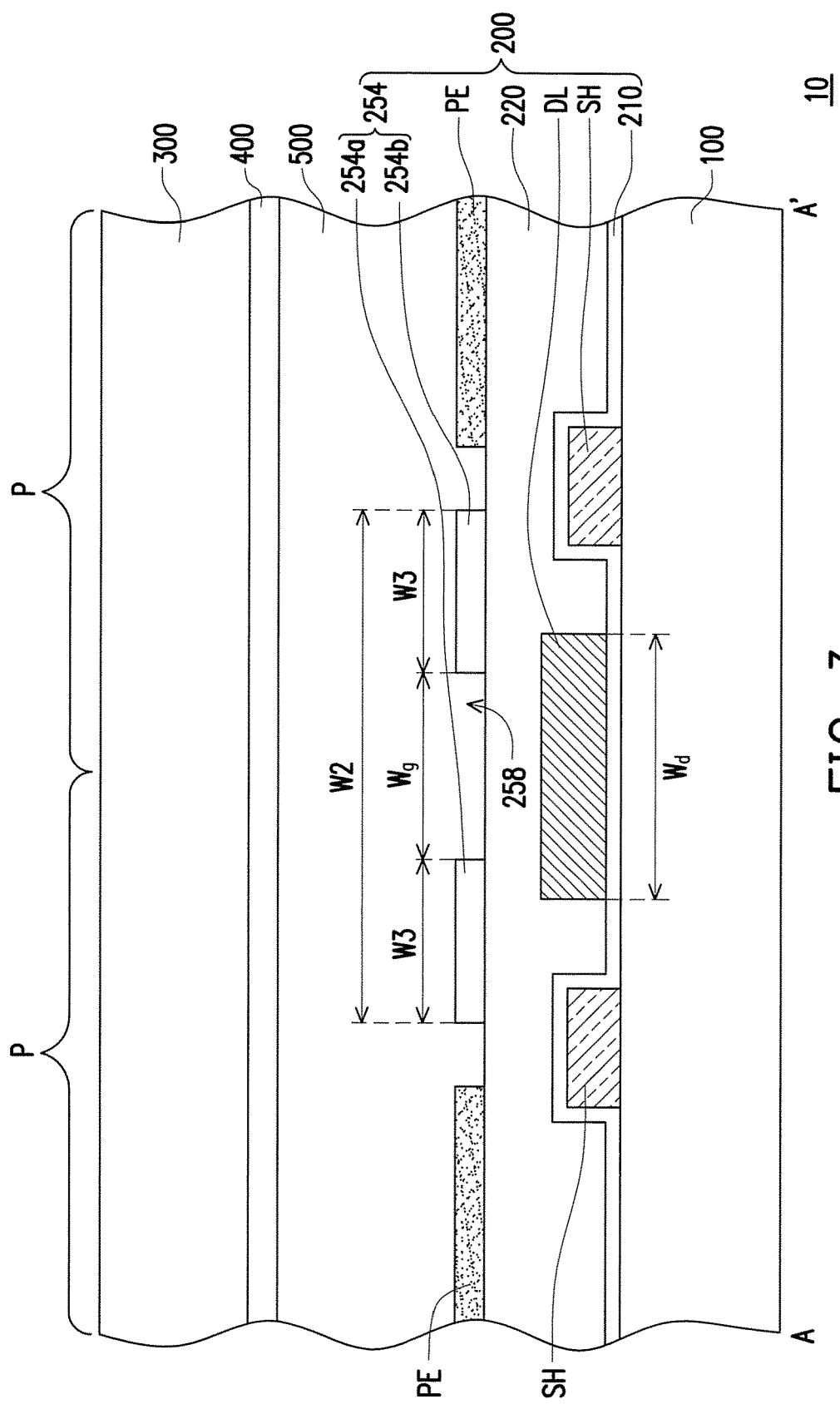
FIG. 3 is a schematic cross-sectional view taken along a section line A-A' depicted in FIG. 2A.

FIG. 2A is a schematic top view illustrating the pixel array according the embodiment of FIG. 1. FIG. 2B is a schematic top view illustrating a partial region of the pixel array depicted in FIG. 2A. FIG. 3 is a schematic cross-sectional view taken along a section line A-A' depicted in FIG. 2A. Referring to FIG. 1 and FIG. 2A, the pixel array 200 is disposed on the first substrate 100 and is covered with the liquid crystal layer 500. The pixel array 200 is constituted by a plurality of the pixel structures P, and at least a portion of the pixel structures is elaborated in following descriptions of FIG. 2A, FIG. 2B and FIG. 3. For illustrative purposes, FIG. 2A exemplarily shows the pixel array 200 with 2×2 pixel structures P; and to be clear and concise, only one of the pixel structure P is described. However, people having ordinary skill in the art should understand that the pixel array 200 depicted in FIG. 1 is constituted by a plurality of the pixel structures P arranged in an array.

As shown in FIG. 2A, one of the at least a portion of the pixel structures P includes a scan line SL, a data line DL, an active device T, a pixel electrode PE, and a conductive strip-shaped pattern 250.

Referring to FIG. 2A and FIG. 3, the scan line SL and the data line DL are disposed on the first substrate 100, in which the scan line SL crosses over the data line DL to form an intersected region X. In other words, an extending direction of the scan line DL is different from an extending direction of the data line DL. Preferably, the extending direction of the scan line SL is substantially perpendicular to the extending direction of the data line DL. The scan line SL and the data line DL are located in different layers and sandwich an insulating layer (not illustrated) therebetween. The scan line SL and the data line DL are mainly configured to transmit a driving signal for driving the pixel structures P. In view of conductivity, the scan line SL and the data line DL are generally made of opaque metal materials, however the disclosure is not limited thereto. For example, the scan line SL and the data line DL may be made of opaque conductive materials, such as alloys, metal oxides, metal nitrides, metal oxynitrides or stacked layers of metal materials and other conductive materials.

Referring to FIG. 2A and FIG. 3, the active device T of the pixel structures P is electrically connected to at least one corresponding scan line SL and at least one corresponding data line DL. In the embodiment, the active device T includes, for example, a gate electrode G, a channel layer CH, a drain electrode D, and a source electrode S. To be specific, the gate electrode G is electrically connected to the scan line SL; an insulating layer 210 is located on the gate electrode G; the channel layer CH is located on the insulating layer 210 and corresponds to the gate electrode G; the drain electrode D and the source electrode S are located on the channel layer CH; and the source S is electrically connected to the data line DL. That is, when a control signal is input to the scan line SL, an electric connection between the scan line SL and the gate electrode G are established; when a control signal is input to the data line DL, an electric connection between the data line DL and the source electrode S are established. In the embodiment, the active device T is a bottom gate thin film transistor (TFT), for instance; however, the disclosure is not limited thereto. According to another embodiment, the active device T may be a top-gate TFT or other suitable types of thin film transistors. For instance, in the top-gate TFT, the channel layer CH is located below the gate electrode G, and the insulating layer 210 is located between the gate electrode G and the channel layer CH. Furthermore, for instance, the gate electrode G and the scan line SL are located in the same layer, and the source electrode S, the drain electrode D and the data line DL are located in the same layer. Namely, the insulating layer 210 is located between a first metal layer (e.g., the gate electrode G and the scan line SL) and a second metal layer (e.g., the source electrode S, the drain electrode D and the data line DL). In one embodiment, a material of the gate electrode G may include, for example, metals, metal oxides, organic conductive materials, or a combination thereof. A material of the channel layer CH may include, for example, amorphous silicon, polysilicon, microcrystalline silicon, single crystal silicon, an organic semiconductor material, an oxide semiconductor material (e.g., indium tin oxide, indium zinc oxide, other suitable materials, or a combination thereof), other suitable materials, the above materials doped with a dopant, or a combination thereof; but the disclosure is not limited thereto. A material of the insulating layer 210 may include, for example, an inorganic material (e.g., silicon oxide, silicon nitride, silicon oxynitride, other suitable materials, or a combination thereof), an organic material (e.g., photoresist, polyimide (PI), benzocyclobutene (BCB), epoxy, prefluorocyclobutane (PFCB), other suitable materials, or a combination thereof), other suitable materials, or a combination thereof.

Referring to FIG. 2A and FIG. 3, the pixel electrode PE is electrically connected to the active device T. To be specific, a first protective layer 220 (as shown in FIG. 3) is located on the active device T and has a contact window C, in which the pixel electrode PE is electrically connected to the drain D of the active device T via the contact window C. For example, the pixel electrode PE of the embodiment has a main portion 260 and a plurality of branched portion 262 (as shown in FIG. 2A) that is connected to the main portion 260. The branched portions 262 are extended along at least four directions from the main portion 260 so as to form a fish-bone pattern and have at least four alignment regions (e.g., four domain regions). Also, a slit 264 is located between every two adjacent branched portions 262. In other embodiments, the main portion 260 may be in a X-shaped pattern or a cross-shaped pattern, in which the branched portions 262 are extended along at least four directions from the main portion 260, and the slit 264 is located between every two adjacent branched portions 262. Owing to the above structure, when the pixel electrode PE is electrically connected to the pixel voltage Vp and the electrode film 400 is electrically connected to the common voltage Vcom, a voltage difference is generated between the pixel electrode PE and the electrode film 400 for driving the liquid crystal layer 500, such that the liquid crystal layer 500 has different tilting directions. In one embodiment, the pixel electrode PE may be a transmissive pixel electrode, a reflective pixel electrode, or a transflective pixel electrode. A material of the transmissive pixel electrode may include metal oxides (e.g., indium tin oxide (ITO), indium zinc oxide (IZO), aluminum tin oxide (ATO), aluminum zinc oxide (AZO), indium-gallium-zinc oxide (IGZO), or any other suitable metal oxide material, or at least two of materials above stacked to each other), carbon nanotube/rod, organic conductive materials, or other suitable metal oxide material, or at least two of materials above stacked to each other. The reflective pixel electrode may include a metal material having high reflectivity, but is not limited thereto. A material of the first protective layer 220 may include, for example, an inorganic material (e.g., silicon oxide, silicon nitride, silicon oxynitride, other suitable materials, or a combination thereof), an organic material (e.g., photoresist, polyimide (PI), benzocyclobutene (BCB), epoxy, prefluorocyclobutane (PFCB), other suitable materials, or a combination thereof), other suitable materials, or a combination thereof. Furthermore, no light-shielding layer (e.g., the black matrix) is located above the data line DL, in other words, the light-shielding layer (e.g., the black matrix) is merely disposed over the scan line SL to partially overlaps the scan line SL, and the color filter layer is disposed in the aforementioned pixel structures P.

Referring to FIG. 2A, the conductive strip-shaped pattern 250 is correspondingly disposed over the data line DL, in which the conductive strip-shaped pattern 250 has an opening 258 (also known as a gap). The opening 258 is at least partially overlapped with the data line DL in a vertical projection on the first substrate 100; in other words, the conductive strip-shaped pattern 250 is not covered with at least a portion of the data line DL in the vertical projection on the first substrate 100. That is, the opening 258 exposes at least a portion of the data line DL. In the embodiment, the conductive strip-shaped pattern 250 includes an extending portion 254 and a bridge portion 256. The extending portion 254 extends along an extending direction of the data line DL (i.e., a second direction D2), and the bridge portion 256 extends along an extending direction of the scan line SL (i.e., a first direction D1). In other embodiments, the data line DL extends along the first direction D1, and the scan line SL extends along the second direction D2, such that the extending portion 254 of the conductive strip-shaped pattern 250 extends along an extending direction of the data line DL (i.e., the first direction D1), and the bridge portion 256 extends along an extending direction of the scan line SL (i.e., the second direction D2).

Referring to FIG. 2A and FIG. 3, the conductive strip-shaped pattern 250 includes a first extending portion 254a and a second extending portion 254b, in which the first extending portion 254a and the second extending portion 254b are respectively disposed on two sides of the data lines DL and are partially overlapped with the data lines DL. Namely, the conductive strip-shaped pattern 250 is disposed over the data line DL and has the opening 258 located between the first extending portion 254a and the second extending portion 254b of the extending portion 254, and the opening 258 is at least partially overlapped with the data line DL in the vertical projection on the first substrate 100, such as the conductive strip-shaped pattern 250 is not covered with at least a portion of the data line DL in the vertical projection on the first substrate 100. In other words, a portion of the data line DL is exposed by the opening 258. That is, owing to the configuration of the opening 258, a portion of each of the first extending portion 254a and the second extending portion 254b is not overlapped with the data line DL, where the first extending portion 254a is separated from the second extending portion 254b. Since the conductive strip-shaped pattern 250 is only overlapped with a portion of the data line DL, an overlapping area between the conductive strip-shaped pattern 250 and the data line DL can be decreased, thereby reducing the RC loading between the conductive strip-shaped pattern 250 and the data line DL. The conductive strip-shaped pattern 250 and the electrode film 400 are electrically connected to substantially the same common voltage Vcom (e.g., substantially the same voltage is applied to both of the conductive strip-shaped pattern 250 and the electrode film 400), and the first extending portion 254a and the second extending portion 254b are respectively located on the two sides of the data line DL (as shown in FIG. 3). Accordingly, a stable electric field at the periphery of the data line DL is ensured, which avoids the issues of the light leakage (due to unstable liquid crystal molecule inclination that is caused by displacement of the first substrate 100 and the second substrate 300), bad contrast and uneven brightness of the panels. Furthermore, with said configuration, the light shielding layer (e.g., the black matrix) is not disposed over the data line DL. The light shielding layer (e.g, the black matrix) is disposed over the scan line SL, which suppresses influences of the light leakage caused by the displacement of the first substrate 100 and the second substrate 300 after being assembled or being bent. In one embodiment, the light shielding layer (e.g., the black matrix) and/or a color filter layer may be disposed on the first substrate 100 or the second substrate 300.

In the embodiment, the at least portion of the pixel structures P has a first region 107. The first region 107 overlaps the scan line SL and the intersected region X in a vertical projection on the first substrate 100; and correspondingly, the bridge portion 256 of the conductive strip-shaped pattern 250 is preferably disposed inside the first region 107. For example, the first region 107 is a region disposed with the scan line SL and the conductive strip-shaped pattern 250; e.g. a region where the scan line SL at least partially overlaps the bridge portion 256 and the extending portion 254 of the conductive strip-shaped pattern 250. Accordingly, the first extending portions 254a and the second extending portion 254b of the conductive strip-shaped pattern 250 are connected to each other through the bridge portion 256, thereby obtaining a much uniform electric field at the periphery of the data line DL. On the other hand, since the bridge portion 256 of the conductive strip-shaped pattern 250 extends along the extending direction (e.g., the first direction D1) of the scan line SL, not only an electric connection between the first extending portion 254a and the second extending portion 254b located in one of the pixel structures P is established, but an electric connection between the first extending portion 254a and the second extending portion 254b of all the pixel structures P arranged along the extending direction of the bridge portion 256 is also established. Accordingly, the conductive strip-shaped pattern 250 of each of the pixel structures P of the pixel array 200 has substantially the same common voltage. Besides, the conductive strip-shaped pattern 250 and the pixel electrode PE are located in the same layer. To consider simplicity of the manufacturing process, the conductive strip-shaped pattern 250 and the pixel electrode PE may be made of the same material, or may be formed in one process, the disclosure is not limited thereto.

FIG. 2B is a schematic top view illustrating a partial region of the pixel array depicted in FIG. 2A. Referring to FIG. 2B, the data line DL has a width Wd, the extending portion 254 has a width W2, the first and second extending portions 254a, 254b respectively have a width of W3, and the opening 258 has a width Wg. To avoid the conductive strip-shaped pattern 250 being shifted during the manufacturing process, the width W2 preferably satisfies W2=(2*W3)+Wg, where the width Wg of the opening 258 is smaller than the width Wd of the data line DL. For example, in the embodiment, the width Wd of the data line DL is about 14 μm, and wherein a width of the overlapping region of the first extending portion 254a and the data line DL is about 2 μm, and a width of the overlapping region of the second extending portion 254b and the data line DL is about 2 μm, but the disclosure is not limited thereto.

Referring to FIG. 2A and FIG. 3 again, the pixel structures P further include a shielding metal layer SH. The shielding metal layer SH is located between the pixel electrode PE and the data line DL. In the embodiment, the shielding metal layer SH and the conductive strip-shaped pattern 250 are, for example, electrically connected to substantially the same common voltage Vcom. Specifically, due to the shielding metal layer SH is coupled to the common voltage Vcom and is located between the data line DL and the pixel electrode PE, the shielding metal layer SH is capable of shielding electrical effects applied on the pixel electrode PE, in which the electrical effects are generated when the data signals are transmitted to the data line DL. Accordingly, the electric field of the pixel electrode PE would not be interfered, thereby enhancing the uniformity of image displaying, and ensuring the display quality. Furthermore, the shielding metal layer SH is partially overlapped with the pixel electrode PE and is coupled to the pixel electrode PE to form a storage capacitor (not marked). The shielding metal layer SH, the data line DL, the gate electrode G, and the scan line SL are separated from each other. As shown in FIG. 3, the shielding metal layer SH of the embodiment is, for example, located in the same layer with the scan line SL, and the shielding metal layer SH and the data line DL are, for example, located in different layers. That is, the insulating layer 210 is located between the first metal layer (e.g., the gate electrode G, the scan line SL and the shielding metal layer SH) and the second metal layer (e.g., the source electrode S, the drain electrode D and the data line DL), however the disclosure is not limited thereto. In other embodiments, the shielding metal layer SH may be located in the same layer with the data line DL, and the shielding metal layer SH and the scan line SL may be located in different layers.

Figure 4:
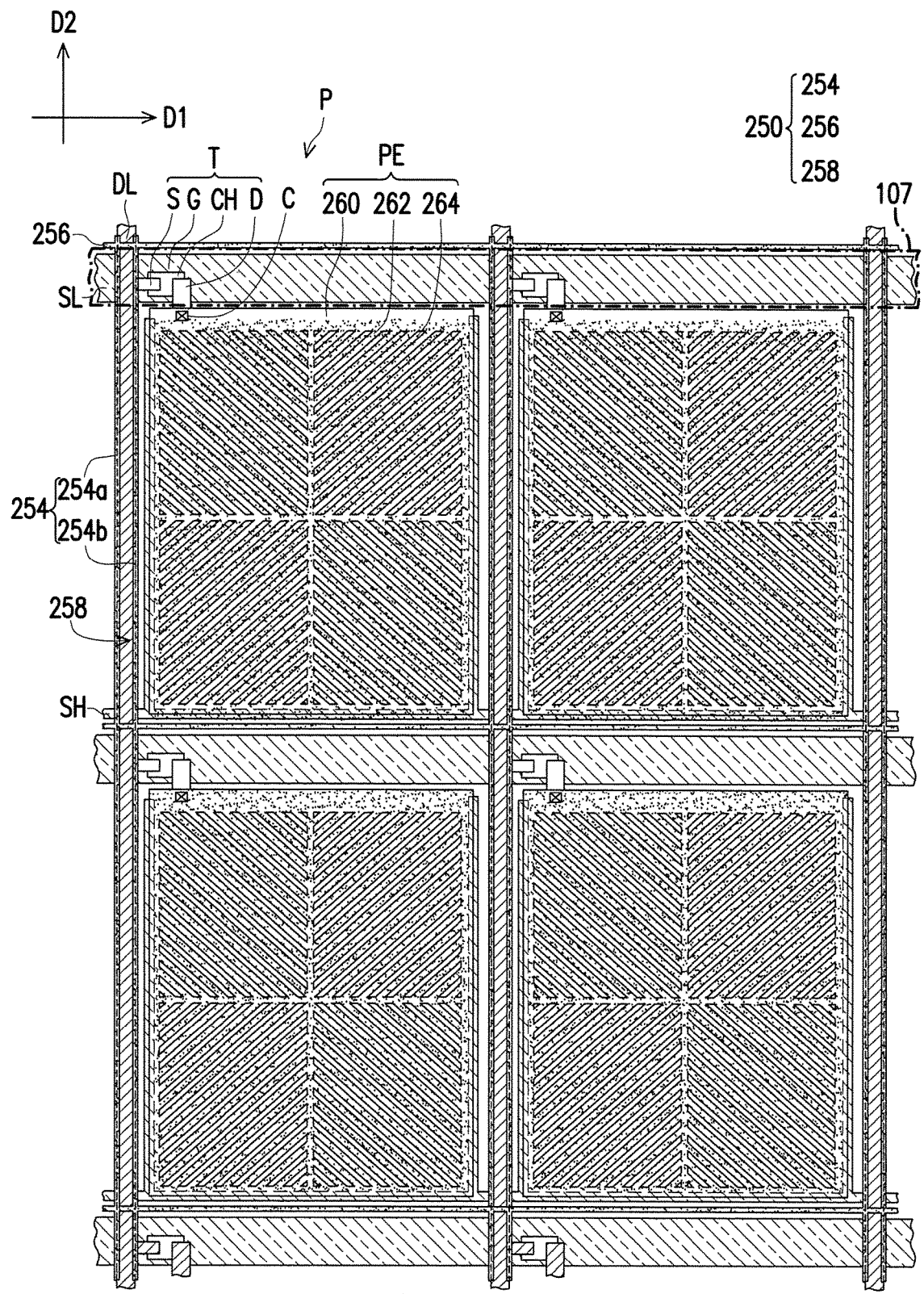
FIG. 4 is a schematic top view illustrating a pixel array according to another embodiment of the disclosure.

Moreover, in the disclosure, the bridge line 256 is not limited to be disposed in the first region 107. In other embodiments, the bridge line 256 may be disposed outside the first region. FIG. 4 is a schematic top view illustrating a pixel array according to another embodiment of the disclosure. As shown in FIG. 4, the pixel array depicted in the FIG. 4 is similar to the pixel array depicted in FIG. 2A. Accordingly, the same or similar devices are represented by the same or similar symbols, and details thereof are no repeated. A difference between the embodiment in FIG. 4 and the embodiment in FIG. 2 is that, the bridge portion 256 of the conductive strip-shaped pattern 250 is disposed outside the first region 107. Specifically, the bridge portion 256 of the conductive strip-shaped pattern 250 is located between the shielding metal layer SH and the scan line SL, e.g., between the shielding metal layer SH and the first region 107. That is, the bridge portion 256 is not overlapped with the scan line SL, but is overlapped with a portion of the data line DL in the intersected region X and the periphery thereof. Furthermore, the bridge portion 256 of the conductive strip-shaped pattern 250 may be selectively located in the same layer with scan line SL. Or, two different portions of the bridge portion 256 may be respectively located in the same layer with any two of the scan line SL, the data line DL and the pixel electrode PE. Owing to such configuration, the parasitic capacitance between the data line DL and the conductive strip-shaped pattern 250 can be further reduced.

In view of above, in the pixel structures and the display panel of the disclosure, the conductive strip-shaped pattern is correspondingly disposed over the data line, which avoids the issues of uneven brightness, uneven contrast, and light leakage caused by a displacement between the upper and lower substrates. Also, through the opening, the overlapping area between the conductive strip-shaped pattern and the data line can be decreased, which reduces the parasitic capacitance and resistance-capacitance loading (RC loading), thereby enhancing display quality.

Figure 5A:
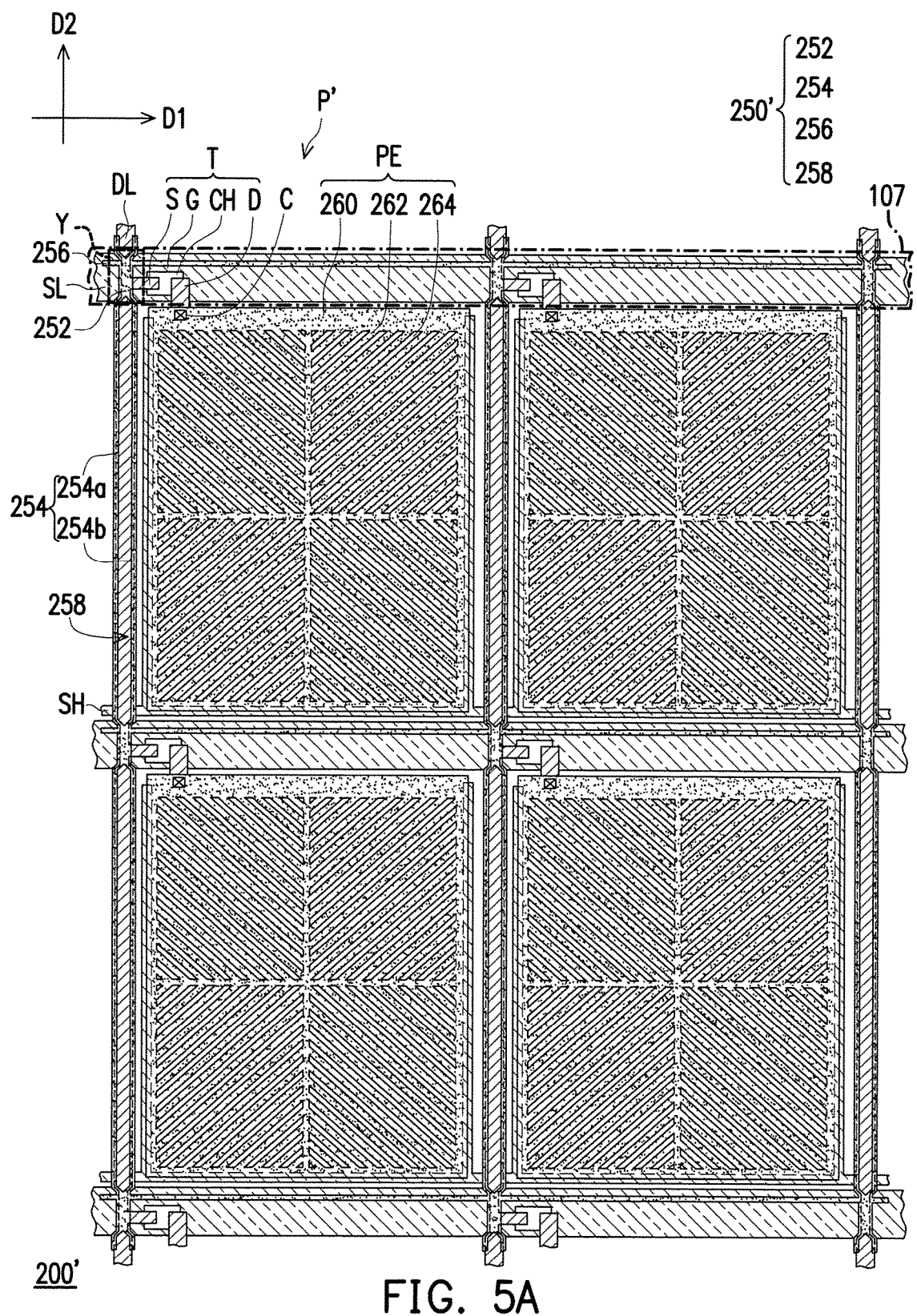
FIG. 5A is a schematic top view illustrating a pixel array according to another embodiment of the disclosure.

FIG. 5A is a schematic top view illustrating a pixel array according to another embodiment of the disclosure. As shown in FIG. 5A, the pixel array 200' depicted in the FIG. 5A is similar to the pixel array 200 depicted in FIG. 2A; therefore, the same or similar devices are represented by the same or similar symbols, and details thereof are no repeated. A difference between the embodiment in FIG. 5a and the embodiment in FIG. 2A is that, the conductive strip-shaped patter is illustrated in an another exemplary form. Specifically, as compared with the conductive strip-shaped pattern 250 in FIG. 2A, the conductive strip-shaped pattern 250' in FIG. 5A further includes a connecting portion 252 located in the first region 107. In detail, the connecting portion 252 is located in an intersected region Y of the data line DL and the scan line SL, wherein the intersected region Y is a part of the first region 107. As shown in FIG. 5A, the data line DL located in the intersected region Y has a width of Wd1, and the rest portion of the data line DL (e.g., the data line DL located outside the intersected region Y) has a width of Wd. The width Wd1 is smaller than the width Wd and greater than about 4 µm.

Referring to FIG. 5A, the conductive strip-shaped pattern 250' includes the connecting portion 252, the extending portion 254, the bridge portion 256 and opening 258. The connecting portion 252 and the extending portion 254 of the conductive strip-shaped pattern 250' extend along the extending direction of the data line DL (e.g., the second direction D2). The bridge portion 256 of the conductive strip-shaped pattern 250' extends along the extending direction of the scan line SL (e.g., the first direction D1). In other embodiments, the extending directions and designs can be modified as described in the aforementioned disclosure, the disclosure is not limited thereto. The connecting portion 252 and the bridge portion 256 are correspondingly disposed inside the first region 107. The connecting portion 252 is located above the data line DL having the width Wd1. The extending portion 254 is located above the data line DL having the width Wd. The opening 258 is at least partially overlapped with the data line DL in a vertical projection on the first substrate 100. Namely, at least a portion of the data line DL is not covered with the conductive strip-shaped pattern 250' in a vertical projection on the first substrate 100. In other words, the opening 258 is located in the extending portion 254, and exposes the data line DL.

Specifically, the extending portion 254 of the conductive strip-shaped pattern 250' includes the first extending portion 254a and the second extending portion 254b. The first extending portion 254a and the second extending portion 254b are respectively disposed on two sides of the data lines DL and are partially overlapped with the data lines DL. Namely, the conductive strip-shaped pattern 250' is disposed over the data line DL and has the opening 258 located between the first extending portion 254a and the second extending portion 254b of the extending portion 254. Accordingly, a portion of the data line DL is not covered by the first extending portion 254a and the second extending portion 254b, thus only the portion of the data line DL is exposed by the opening 258. Owing to the configuration of the opening 258, a portion of each of the first extending portion 254a and the second extending portion 254b is not overlapped with the data line DL (in a direction perpendicular to the first substrate 100), which decreases the overlapping area of the conductive strip-shaped pattern 250' and the data line DL. In addition, by narrowing the line width of the data line DL located in the first region 107 (e.g., the intersected region Y), the overlapping area of the conductive strip-shaped pattern 250' (e.g., the connecting portion 252) and the data line DL is further decreased. Accordingly, the parasitic capacitance between the data line DL and the conductive strip-shaped pattern 250' can be greatly reduced. The conductive strip-shaped pattern 250' and the electrode film 400 are electrically connected to substantially the same common voltage Vcom (e.g., a voltage is applied to both of the conductive strip-shaped pattern 250 and the electrode film 400), and the first extending portion 254a and the second extending portion 254b not overlapping the data line DL are respectively located on the two sides of the data line DL. Accordingly, a stable electric field at the periphery of the data line DL is ensured, which avoids the issues of the light leakage (due to unstable liquid crystal molecule inclination that is caused by displacement of the first substrate 100 and the second substrate 300), bad contrast and uneven brightness of the panels.

In the embodiment, the extending portion 254 is, for example, connected to the connecting portion 252, and the connecting portion 252 is, for example, connected to the bridge portion 256. The connecting portion 252 and the bridge portion 256 both are located in the first region 107, as shown in FIG. 5A. However, the disclosure is not limited thereto. In other embodiments, the extending portion 254 is, for example, connected to the connecting portion 252, and the extending portion 254 is, for example, further connected to the bridge portion 256. The connecting portion 252 is located in the first region 107, and the bridge portion 256 may be selectively located in the first region 107 or outside the first region 107. Accordingly, the first extending portions 254a and the second extending portion 254b of the conductive strip-shaped pattern 250' are connected to each other, thereby enhancing uniformity of the electric field at the periphery of the data line DL. On the other hand, since the bridge portion 256 of the conductive strip-shaped pattern 250' extends along the extending direction (e.g., the first direction D1) of the scan line SL, an electric connection between the first extending portion 254a and the second extending portion 254b located in one of the pixel structures P is established. Additionally, an electric connection between the first extending portion 254a and the second extending portion 254b of all the pixel structures P arranged along the extending direction of the bridge portion 256 is established. Accordingly, the conductive strip-shaped pattern 250' of each of the pixel structures P of the pixel array 200' has substantially the same common voltage Vcom.

Figure 5B:
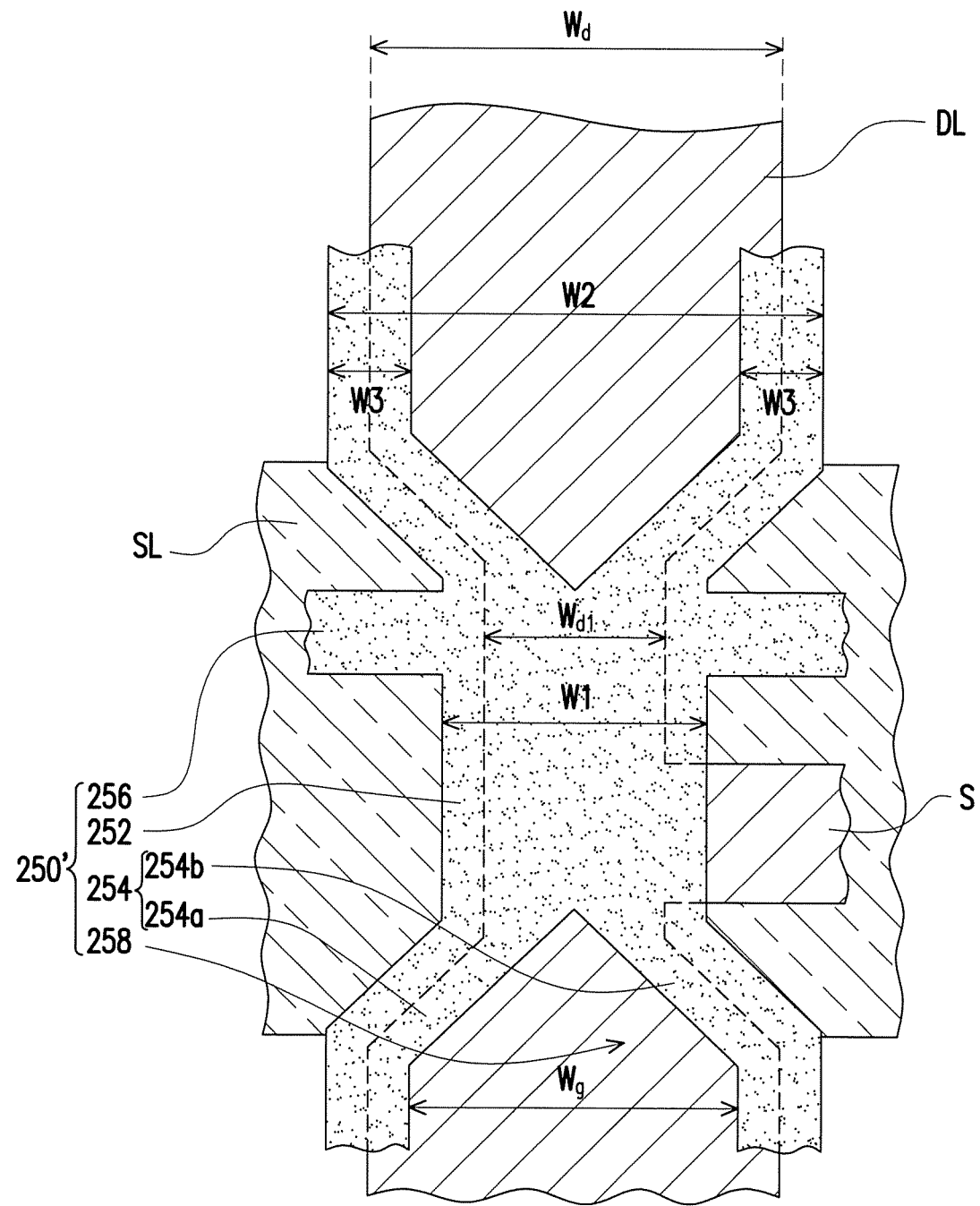
FIG. 5B is a schematic top view illustrating a partial region of the pixel array depicted in FIG. 5A.

FIG. 5B is a schematic top view illustrating a partial region (including the intersected region Y) of the pixel array depicted in FIG. 5A. Referring to FIG. 5B, the connecting portion 252 has a width W1, the extending portion 254 has a width W2, the first and second extending portions 254a, 254b respectively have a width of W3, and the opening 258 has a width Wg. The width W2 preferably satisfies W2= (2*W3)+Wg, where the width W1 is smaller than the width W2 and greater than the width W3, and the width Wg of the opening 258 is smaller than the width Wd of the data line DL. For example, in the embodiment, the width W1 of the connecting portion 252 of the conductive strip-shaped pattern 250' is, for example, greater than the width Wd1, but the disclosure is not limited thereto. In one embodiment, the width W1 of the connecting portion 252 of the conductive strip-shaped pattern 250' is, for example, equal to the width Wd1. In the embodiment, the conductive strip-shaped pattern 250' is located in the same layer with the pixel electrode PE, thus the materials of the conductive strip-shaped pattern 250' and the pixel electrode PE are the same.

Accordingly, in the pixel structures and the display panel of the disclosure, the conductive strip-shaped pattern is correspondingly disposed over the data line, which avoids the issues of uneven brightness, uneven contrast, and light leakage caused by a displacement between the upper and lower substrates. Furthermore, through the opening, the overlapping area between the conductive strip-shaped pattern and the data line can be greatly decreased, which reduces the parasitic capacitance and resistance-capacitance loading (RC loading), thereby enhancing display quality.

To prove that the design of the display panels described herein is able to obtain lower parasitic capacitances, several experimental examples are provided hereinafter for verification purposes. Referring to Table 1 as below, the parasitic capacitances generated between the data line and the electrode layer disposed thereon of Sample 1, Sample 2, and Sample 3 are respectively measured. The pixel array (with conductive strip-shaped pattern 250) depicted in FIG. 2A is employed in the display panel of Sample 1. The pixel array (with conductive strip-shaped pattern 250') depicted in FIG. 5A is employed in the display panel of Sample 2. A pixel array of a comparative embodiment (as shown in FIG. 6) is employed in the display panel of Sample 3.

Figure 6:
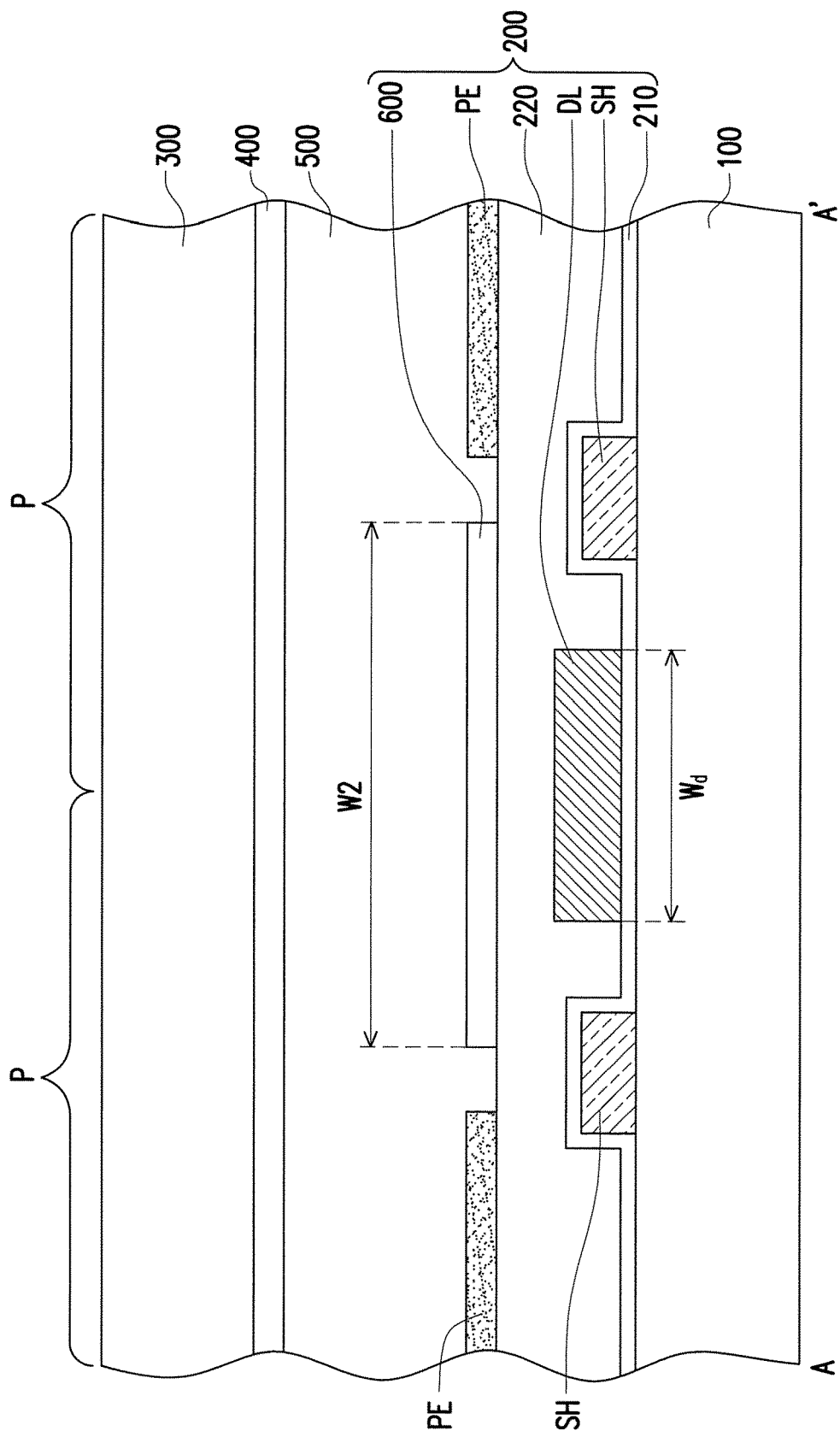
FIG. 6 is a schematic cross-sectional view illustrating a display panel according to a comparative embodiment of the disclosure.

In detail, FIG. 6 is a schematic cross-sectional view taken along a section line A-A', illustrating a display panel according to a comparative embodiment of the disclosure. A location of the section line A-A' in FIG. 6 is similar to the location of the section line A-A' depicted in FIG. 2A. The display panel in FIG. 6 is similar to the display panel (having the pixel array shown in FIG. 2A) of the FIG. 3, and thus the same or similar devices are represented by the same or similar symbols, and details thereof are no repeated. A difference between the comparative embodiment in FIG. 6 and the embodiment in FIG. 3 is that, the conductive strip-shaped pattern 600 depicted in FIG. 6 has no opening 258 to expose the data line DL and is overlapped with the data line DL in a direction perpendicular to the first substrate 100. That is, the conductive strip-shaped pattern 600 completely covers the data line DL. Furthermore, for Sample 1 to Sample 3, the light shielding layer is at least partially overlapped with the scan line SL, but the light shielding layer is located neither on top of the data line DL nor underneath the data line DL.

TABLE 1

| Sample | 1 | 2 | 3 |
| --- | --- | --- | --- |
| Parasitic Capacitance, (pF) | 466.56 | 402.47 | 493.90 |

Based on Table 1, compared to the display panel of the comparative embodiment (i.e., Sample 3), the display panels of the disclosure, indeed, effectively reduce the parasitic capacitance between the data line and the electrode layer disposed thereon, wherein Sample 2 has the most superior result.

Figure 7A:
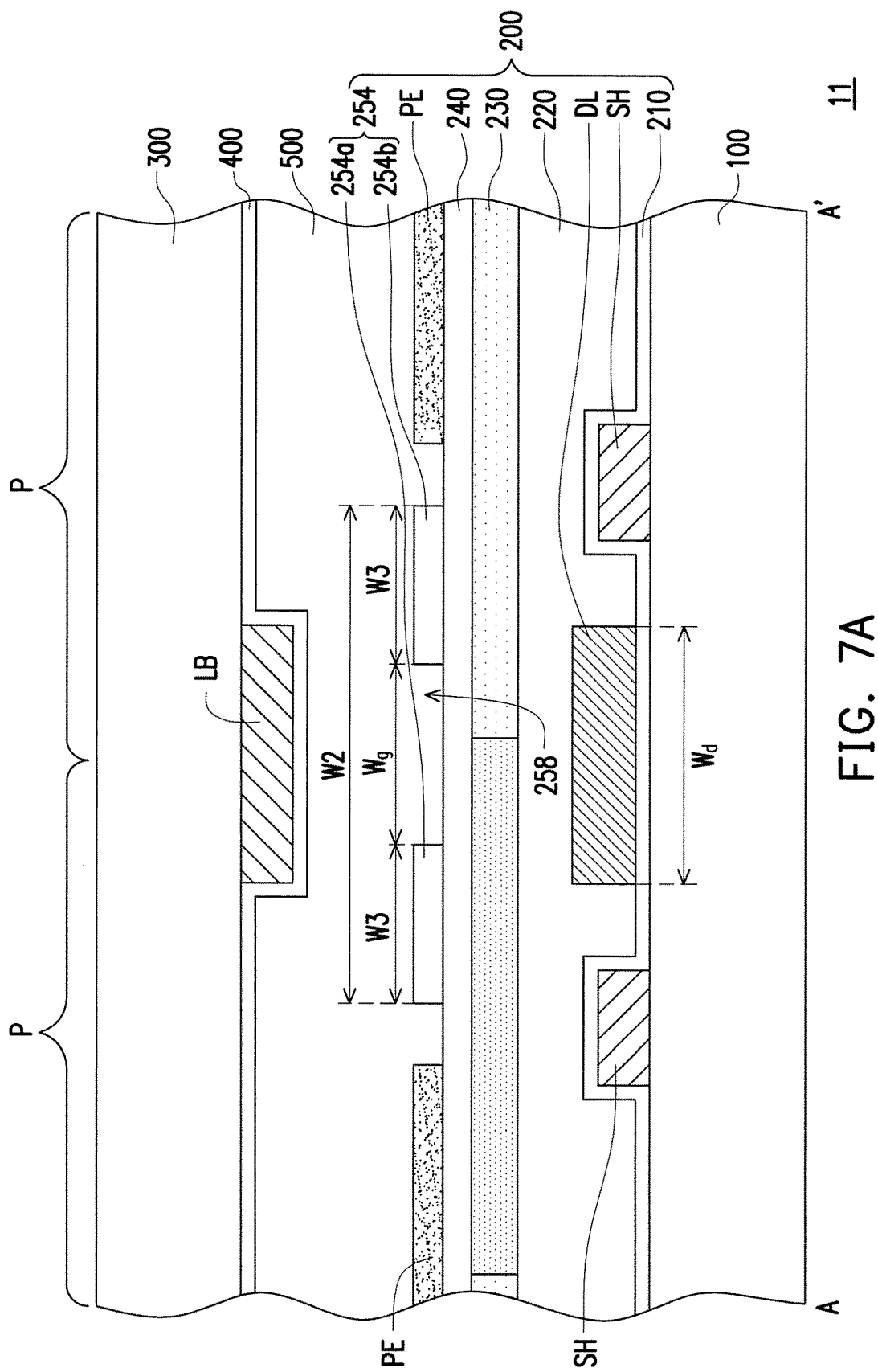
FIG. 7A and FIG. 7B are schematic cross-sectional views illustrating a display panel according to another embodiment of the disclosure.
Figure 7B:
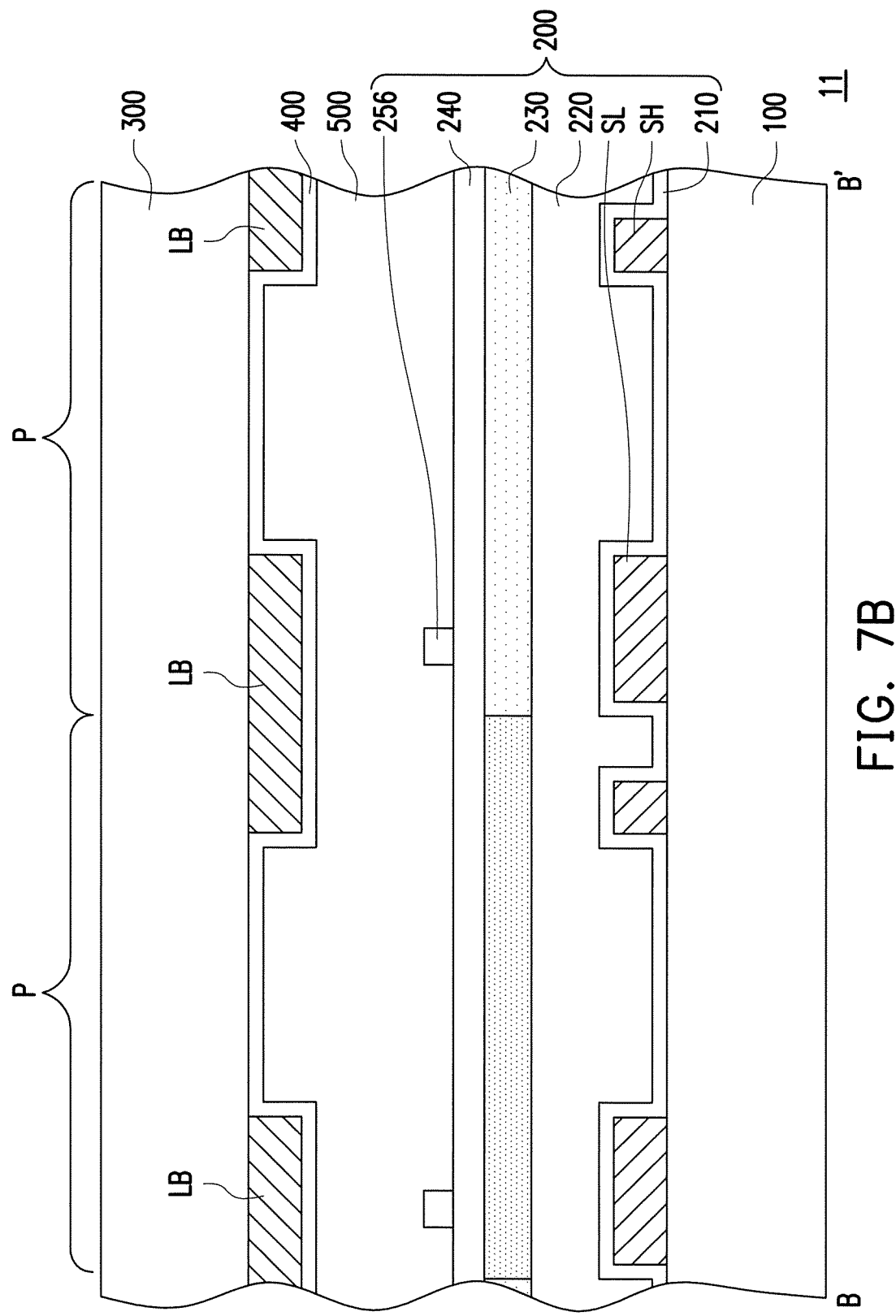

FIG. 7A and FIG. 7B are schematic cross-sectional views illustrating a display panel according to another embodiment of the disclosure. As shown in FIG. 7A and FIG. 7B, the display panel 11 in FIG. 7A and FIG. 7B is similar to the display panel 10 in FIG. 3, and thus the same or similar devices are represented by the same or similar symbols, and details thereof are no repeated. Further, if accuracy of the alignment of the first substrate 100 and the second substrate 300 is improved, the light shielding layer (the black matrix) previously omitted can be still employed. Therefore, a difference between the embodiment in FIG. 7A and FIG. 7B and the embodiment in FIG. 3 is that, the display panel 11 depicted in FIG. 7A and FIG. 7B further includes a light shielding layer LB (e.g., the black matrix) and a color filter layer 230.

Specifically, a disposing configuration of the scan line SL, the data line DL, the shielding metal layer SH, the light shielding layer LB, the color filter layer 230 and the conductive strip-shaped pattern 250 is shown in FIG. 7A and FIG. 7B.

Referring FIG. 7A and FIG. 7B, the light shielding layer LB is at least partially overlapped with a portion of the scan line SL and/or the data line DL of each of the pixel structures P and is disposed inside each of the pixel structures P. For example, the light shielding layer LB is located on the second substrate 300 and is overlapped with the scan line SL and the data line DL of each of the pixel structures P. To be specific, the light shielding layer LB is located between the second substrate 300 and the electrode film 400, and the light shielding layer LB includes, for example, a plurality of light shielding patterns. As shown in FIG. 7A, each of the light shielding patterns is respectively disposed over the corresponding data line DL of one of the pixel structures P, and extends along the extending direction of the data line DL. Furthermore, as shown in FIG. 7B, each of the light shielding patterns is respectively disposed over the corresponding scan line SL of one of the pixel structures P, and extends along the extending direction of the scan line SL. Namely, the light shielding layer LB includes, for example, the light shielding patterns that are arranged in a mesh-shaped form to cover over the data line DL and the scan line SL. Owing to the configuration of the light shielding layer LB, the issue of light leakage in the pixel structures P can be further reduced, thereby ensuring the display quality. However, the disclosure is not limited thereto. In other embodiments, the light shielding layer LB may only be, for example, disposed over the scan line SL or the data line DL.

In addition, the color filter layer 230 is disposed on the first substrate 100. As shown in FIG. 7A and FIG. 7B, the color filter layer 230 is located between the first protective layer 220 and the second protective layer 240. Through the first protective layer 220, the color filter layer 230 is electrically isolated from the scan line SL, the data line DL and the shielding metal layer SH that are disposed underneath the color filter layer 230. And, through the second protective layer 240, the color filter layer 230 is electrically isolated from the pixel electrode PE and the connecting portion 256 of the conductive strip-shaped pattern 250. That is, to ensure the display quality, the color filter layer 230 is electrically isolated from the active device T disposed therebelow through the first protective layer 220; and further, the color filter layer 230 is electrically isolated from the conductive strip-shaped pattern 250 and the pixel electrode disposed thereon through the second protective layer 240. A material of the second protective layer 240 may be selected from the aforesaid materials of the first protective layer 220, wherein the materials of the first protective layer 220 and the second protective layer 240 can be substantially the same or different.

Figure 8:
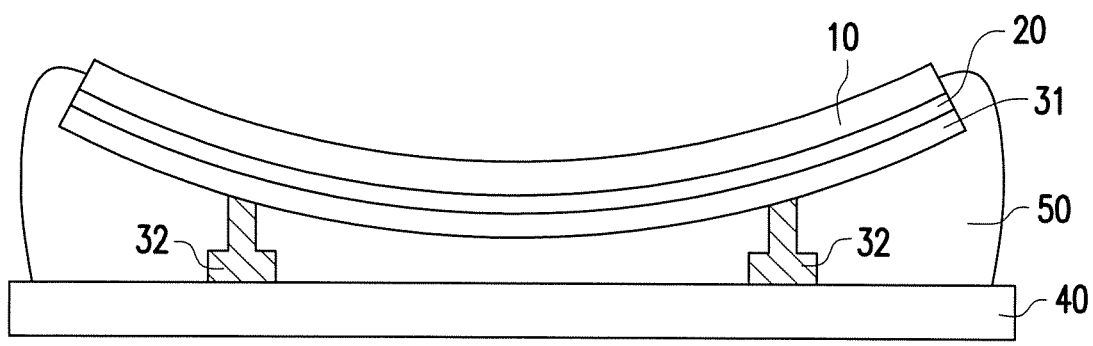
FIG. 8 is a schematic view illustrating a curved display device according to an embodiment of the disclosure.

FIG. 8 is a schematic view illustrating a curved display device according to an embodiment of the disclosure. Referring to FIG. 8, a curved display device 1000 includes a display panel 10, a backlight module 20 and a bending element 30. The display panel 10 may include one of the display panels in the aforesaid embodiments. The backlight module 20 is located at the backside of the display panel 10. The backlight module 20 may include a light source and a light guide plate, or only include a light source. In one embodiment, the backlight module 20 may include the light source and the light guide plate, wherein the light source is disposed at a side of the light guide plate, and thus the light emitted by the light source is guided to enter the display panel 10 through the light guide plate. In another embodiment, the backlight module 20 may only include the light source, wherein the light source is disposed at the backside or side of the display panel 10, that allows the light emitted by the light source to enter the display panel 10 without a light guide plate. On the other hand, the bending element 30 is disposed at the backside of the backlight module 20 to fix the display panel 10 and the backlight module 20. As such, the display panel 10 and the backlight module 20 has a curvature. Therefore, the display panel 10 is bent to form a display panel having a curved shape. As shown in FIG. 8, in the embodiment, the bending element 30 includes a frame 31 and a fixed element (such as screw, or other suitable elements) 32, but is not limited thereto. Materials of the frame 31 and the screw 32 may include ductile metals or any other suitable materials. In other embodiments, the bending element 30 may only include the frame 31. Furthermore, the curved display device 1000 may further include a cover plate 40 to fix the screw 32 thereon. The curved display device 1000 may also include a sealing element 50 that is connected to the cover plate 40. In the embodiment, a center of the curvature of the curved display device 1000 lies near a surface of the display panel 10 opposite to the cover plate 40, wherein the display panel 10 is radially inwardly curved (e.g., protruding toward the cover plate 40). On the other embodiment, the center of the curvature of the curved display panel 1000 lies near a surface of the display panel 10 facing to the cover plate 40, wherein the display panel 10 is radially outwardly curved (e.g., protruding away the cover plate 40).

To sum up, in the pixel structure and the display panel of the disclosure, the conductive strip-shaped pattern is correspondingly disposed over the data line and has the opening at least partially exposing the data line. In addition to prevent the issues of uneven brightness, uneven contrast and light leakage caused by a displacement between the upper and lower substrates of the display panel can be prevented, an overlapping area between the conductive strip-shaped pattern and the data line is decreased, and the parasitic capacitance and the RC loading are reduced, thereby ensuring the display quality and the transmittance.

In addition, by narrowing the line width of the data line located in the intersected region of the scan line and the data line, the overlapping area of the conductive strip-shaped pattern and the data line is further decreased. Accordingly, the parasitic capacitance between the data line and the conductive strip-shaped pattern is greatly reduced as so to ensure the display quality and the transmittance.

It will be apparent to those skilled in the art that various modifications and variations can be made to the disclosure without departing from the scope or spirit of the disclosure. In view of the foregoing, it is intended that the disclosure cover modifications and variations of this disclosure provided they fall within the scope of the following claims and their equivalents.

What is claimed is:
1. A display panel, comprising:
a first substrate;
a pixel array, disposed on the first substrate, wherein the pixel array comprises a plurality of pixel structures, and each of at least a portion of the pixel structures comprises:
a scan line and a data line, wherein the data line has two opposite sides;
an active device, electrically connected to the scan line and the data line;
a pixel electrode, electrically connected to the active device; and
a conductive strip-shaped pattern, correspondingly disposed over the data line and having an opening at least partially overlapped with the data line in a vertical projection on the first substrate, wherein a portion of the conductive strip-shape pattern is overlapped with the two opposite sides of the data line, the opening is between the two opposite sides of the data line in the vertical projection on the first substrate, and the conductive strip-shaped pattern comprises:
at least one bridge portion; and
two extending portions, connected to the bridge portion, wherein the extending portions are respectively corresponding to the two opposite sides of the data line, and the opening is located between the extending portions;
a second substrate, disposed opposite to the first substrate;
an electrode film, disposed on the second substrate, wherein a voltage applied to the electrode film is substantially the same as a voltage applied to the conductive strip-shaped pattern of each of the at least a portion of the pixel structures; and a liquid crystal layer, located between the first substrate and the second substrate.

2. The display panel of claim 1, wherein each of the at least a portion of the pixel structures further comprises a shielding metal layer located between the pixel electrode and the data line, wherein the shielding metal layer and the scan line are in the same layer.

3. The display panel of claim 1, wherein each of the at least a portion of the pixel structures has a first region, wherein the first region is overlapped with the scan line in a vertical projection at the first substrate, and the bridge portion of the conductive strip-shaped pattern is correspondingly disposed in the first region.

4. The display panel of claim 3, wherein the first region has an overlapping area that the conductive strip-shaped pattern being overlapped with the data line, and a line width of the data line located inside the overlapping area is smaller than a line width of the data line not overlapping the scan line.

5. The display panel of one of claim 1, further comprising:
a light shielding layer, at least overlapped with a portion of the scan line, wherein the light shielding layer is not located on top of the data line or underneath the data line.

6. The display panel of one of claim 1, further comprising:
a light shielding layer, at least overlapped with a portion of the scan line and/or the data line.

7. A curved display device, comprising:
the display panel of claim 1;
a backlight module, located at a side of the display panel; and
a bending element, fixing the display panel and the backlight module, wherein the display panel and the backlight module have a curvature.

8. The display panel of claim 1, wherein the opening is an enclosed opening basically constituted by connecting the two extending portions of one pixel structure of the at least a portion of the pixel structures to the bridge portion of another pixel structure of the at least a portion of the pixel structures adjacent thereto.

9. The display panel of claim 1, wherein the conductive strip-shaped pattern of each of the at least a portion of the pixel structures further comprises:
a connecting portion, connected to the bridge portion and the two extending portions.

10. The display panel of claim 9, wherein the opening is an enclosed opening basically constituted by connecting the two extending portions of one pixel structure of the at least a portion of the pixel structures to the connecting portion of another pixel structure of the at least a portion of the pixel structures adjacent thereto.

11. The display panel of claim 1, wherein the bridge portions comprised in the conductive strip-shaped patterns of two adjacent pixel structures of the at least a portion of the pixel structures are connected to each other.

12. The display panel of claim 1, wherein the pixel electrode and the conductive strip-shaped pattern are in the same layer.

13. The display panel of claim 1, wherein a width of the opening is less than a width of the data line.

* * * * *